US012417742B2

(12) United States Patent
Zhang

(10) Patent No.: US 12,417,742 B2
(45) Date of Patent: Sep. 16, 2025

(54) PIXEL DRIVING CIRCUIT AND DISPLAY DEVICE

(71) Applicant: Shenzhen China Star Optoelectronics Semiconductor Display Technology Co., Ltd., Guangdong (CN)

(72) Inventor: Huanxi Zhang, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/887,118

(22) Filed: Sep. 17, 2024

(65) Prior Publication Data

US 2025/0182688 A1 Jun. 5, 2025

(30) Foreign Application Priority Data

Dec. 1, 2023 (CN) ......................... 202311644918.5

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01); *G09G 2300/0852* (2013.01); *G09G 2300/0861* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 7,825,880 B2 * | 11/2010 | Yumoto | G09G 3/3233 345/80 |
| 11,508,320 B2 * | 11/2022 | Kim | G09G 3/3266 |
| 2011/0227885 A1 * | 9/2011 | Chung | G09G 3/3233 345/204 |
| 2021/0049965 A1 * | 2/2021 | Jeon | G09G 3/3266 |
| 2021/0248961 A1 * | 8/2021 | Yang | G09G 3/3266 |
| 2023/0267882 A1 * | 8/2023 | Yang | G09G 3/3233 |
| 2023/0317015 A1 * | 10/2023 | Chen | H10D 86/481 345/204 |
| 2024/0144881 A1 * | 5/2024 | Park | G09G 3/3233 |
| 2024/0161685 A1 * | 5/2024 | Park | H10K 59/131 |
| 2024/0249661 A1 * | 7/2024 | Jin | G09G 3/2096 |
| 2024/0257720 A1 * | 8/2024 | Yeom | G09G 3/3233 |

* cited by examiner

*Primary Examiner* — Dorothy Harris
(74) *Attorney, Agent, or Firm* — Nathan & Associates Patent Agents Ltd.; Menachem Nathan

(57) ABSTRACT

A pixel driving circuit and a display panel may be provided. The pixel driving circuit may include: a driving transistor set to an N-type oxide semiconductor thin film transistor.

18 Claims, 10 Drawing Sheets

PIXEL DRIVING CIRCUIT AND DISPLAY DEVICE

CROSS-REFERENCE TO RELATED APPLICATION

This application claims priority to and the benefit of Chinese Patent Application No. 202311644918.5, filed on Dec. 1, 2023, the entire content of which is hereby incorporated by reference.

TECHNICAL FIELD

The present disclosure relates to the field of display technologies, and more particularly to a pixel driving circuit and a display device.

BACKGROUND

Low Temperature Poly-silicon (LTPS) Organic Light-Emitting Diode (OLED) may have been popular since its appearance because of its stable characteristics. However, as the technology is updated, the consumer's requirements for the performance of the OLED panel may be gradually increased, and the power consumption is a significant requirement thereof. The power consumption of the OLED panel may be divided into display region (AA region) power consumption and Integrated Circuit (IC) power consumption, and the AA region power consumption may occupy a larger portion of the power consumption of the OLED panel, so reducing of the AA region power consumption may become a common topic and difficulty in reducing power consumption of the OLED panel.

In the related art, an Electro Luminescent (EL) material may be adjusted to reduce power consumption. However, as the efficiency of the EL material is increased, the effect of reducing power consumption becomes smaller and smaller. Since the power consumption=voltage*current, the higher a voltage of a Thin Film Transistor (TFT) is, the more proportion of the power consumption of the TFT in the power consumption of OLED panel is. Thus, reducing of a voltage of the TFT operating in a saturation region may be an effective means of reducing the AA region power consumption.

SUMMARY

Embodiments of the present disclosure may provide a pixel driving circuit and a display device, in which a driving transistor is set to an N-type oxide semiconductor thin film transistor, so that the AA region power consumption can be effectively reduced.

In a first aspect, an embodiment of the present disclosure provides a pixel driving circuit, including: a driving transistor set to an N-type oxide semiconductor thin film transistor, where a source of the driving transistor is connected to a first power supply signal, a drain of the driving transistor is connected to a second power supply signal, and a voltage value of the first power supply signal is lower than a voltage value of the second power supply signal; a light emitting circuit, where a cathode of the light emitting circuit is connected to the first power supply signal, and an anode of the light emitting circuit is connected to the source of the driving transistor; a first reset circuit, where a control terminal of the first reset circuit is connected to a reset control signal, an input terminal of the first reset circuit is connected to a first reset signal, an output terminal of the first reset circuit is connected to the driving transistor, and the first reset circuit supplies the first reset signal to the source of the driving transistor, the drain of the driving transistor and the anode of the light emitting circuit under the control of the reset control signal; a second reset circuit, where a control terminal of the second reset circuit is connected to a first control signal, an input terminal of the second reset circuit is connected to a second reset signal, and the second reset circuit supplies the second reset signal to the gate of the driving transistor under the control of the first control signal; a compensation circuit, where a control terminal of the compensation circuit is connected to a second control signal, an input terminal of the compensation circuit is connected to a compensation voltage signal, and an output terminal of the compensation circuit is connected to the source of the driving transistor; a data writing circuit, where a control terminal of the data writing circuit is connected to a third control signal, an input terminal of the data writing circuit is connected to a data signal, and an output terminal of the data writing circuit is connected to the gate of the driving transistor; and a light emitting control circuit, where a control terminal of the light emitting control circuit is connected to a light emitting control signal, and an input terminal and an output terminal of the light emitting control circuit are connected to the first power supply signal and the second power supply signal, respectively.

In some embodiments of the present disclosure, the second reset circuit may include a first transistor, a second transistor, and a bootstrap capacitor; a gate of the first transistor is connected to the first control signal, one of a source and a drain of the first transistor is connected to the drain of the driving transistor, and another of the source and the drain of the first transistor is connected to the gate of the driving transistor; one terminal of the bootstrap capacitor is connected to the gate of the driving transistor, another terminal of the bootstrap capacitor is connected to a first node, and the output terminal of the data writing circuit is connected to the first node; and a gate of the second transistor is connected to the first control signal, one of a source and a drain of the second transistor is connected to the second reset signal, and another of the source and the drain of the second transistor is connected to the first node.

In some embodiments of the present disclosure, the compensation circuit may include a compensation transistor, where a gate of the compensation transistor is connected to the second control signal, one of a source and a drain of the compensation transistor is connected to the compensation voltage signal, another of the source and the drain of the compensation transistor is connected to the source of the driving transistor, and the compensation voltage signal is set to a fixed voltage.

In some embodiments of the present disclosure, the data writing circuit may include a data writing transistor and a storage capacitor; one terminal of the storage capacitor is connected to the first node, and another terminal of the storage capacitor is connected to the second power supply signal; and a gate of the data writing transistor is connected to the third control signal, one of a source and a drain of the data writing transistor is connected to the data signal, and another of the source and the drain of the data writing transistor is connected to the first node.

In some embodiments of the present disclosure, the light emitting control signal may include a first light emitting signal and a second light emitting signal, and the light emitting control circuit may include a first light emitting control transistor and a second light emitting control transistor; a gate of the first light emitting control transistor is connected to the first light emitting signal, one of a source and a drain of the first light emitting control transistor is connected to the second power supply signal, and another of the source and the drain of the first light emitting control transistor is connected to the drain of the driving transistor; and a gate of the second light emitting control transistor is connected to the second light emitting signal, one of a source and a drain of the second light emitting control transistor is connected to the first power supply signal, and another of the source and the drain of the second light emitting control transistor is connected to the source of the driving transistor.

In some embodiments of the present disclosure, the first reset circuit may include a third transistor, where a gate of the third transistor is connected to the reset control signal, one of a source and a drain of the third transistor is connected to the first reset signal, another of the source and the drain of the third transistor is connected to the source of the driving transistor, and the first reset signal and the second reset signal are a same signal.

In some embodiments of the present disclosure, drive timing of the pixel driving circuit may include: a first reset phase in which the third transistor and the second light emitting control transistor both are turned on, and the first reset signal is written into the source of the driving transistor, the drain of the driving transistor, and the anode of the light emitting circuit; a second reset phase in which the first transistor, the second transistor, and the third transistor all are turned on, the first reset signal is written into the gate of the driving transistor, and the second reset signal is written into the first node; a capacitor charging phase in which the first transistor, the second transistor, and the compensation transistor all are turned on, the compensation voltage signal is written into the source of the driving transistor, and a threshold voltage of the driving transistor is captured and written into the gate of the driving transistor; a data writing phase in which the data writing transistor is turned on, the data signal is written into the first node, the data signal is coupled to the gate of the driving transistor by the bootstrap capacitor, and the storage capacitor is charged; and a light emitting phase in which the first light emitting control transistor and the second light emitting control transistor both are turned on, and the light emitting circuit is configured to emit light.

In some embodiments of the present disclosure, the driving timing of the pixel driving circuit further comprises: after the light emitting phase, a third reset phase in which the third transistor and the second light emitting control transistor both are turned on, and the first reset signal is written into the source of the driving transistor, the drain of the driving transistor, and the anode of the light emitting circuit; and a light emitting holding phase in which the first light emitting control transistor and the second light emitting control transistor both are turned on, and the light emitting circuit is configured to emit light.

In some embodiments of the present disclosure, the transistors each are N-type oxide semiconductor thin film transistors.

In a second aspect, another embodiment of the present disclosure may further provide a display device, including the pixel driving circuit of any one of the foregoing.

According to the pixel driving circuit and the display device provided by the embodiments of the present disclosure, the driving transistor is set to an N-type oxide semiconductor thin film transistor, and the AA region power consumption can be effectively reduced with respect to the P-type oxide semiconductor thin film transistor as the driving transistor. In addition, the compensation circuit captures and writes the threshold voltage Vth of the driving transistor into the gate of the driving transistor, and then the data writing circuit can directly write data signal Data into the gate of the driving transistor in writing the data signal Data without performing internal compensation for the Vth.

BRIEF DESCRIPTION OF THE DRAWINGS

Technical solutions and other beneficial effects of the present application are apparent below from detailed description of the embodiments of the present application in combination with the accompanying drawings.

DETAILED DESCRIPTION

Figure 1:
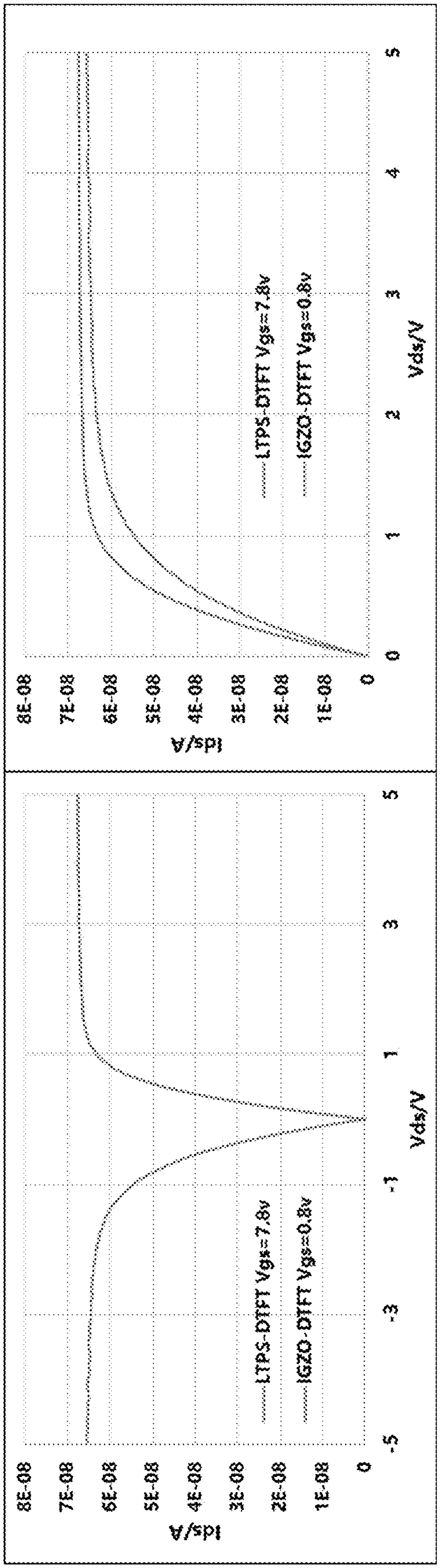
FIG. 1 is a schematic diagram of a correspondence between Vds and Ids in a saturated operation state of LTPS and IGZO.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present application, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present application, rather than indicate or imply that the devices or elements referred to herein are required to have specific orientations or be constructed or operate in the specific orientations. Accordingly, the terms should not be construed as limiting the present application. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present application, the meaning of "plural" is two or more, unless otherwise specifically defined.

In the description of the present disclosure, it should be noted that unless otherwise clearly defined and limited, the terms "mounted", "connected", and "connection" should be interpreted broadly. The terms may refer to an electrical connection, or communication with each other. The terms may refer to a direct connection, an indirect connection through an intermediary or other element, or an interconnection between two elements or interactive relationship between two elements. Those ordinary skilled in the art can understand the specific meanings of the above terms in the present application according to specific situations.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that horizontal height of the first feature is lower than that of the second feature.

The following description provides various embodiments or examples for implementing various structures of the present application. To simplify the description of the present application, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present application provides specific examples of various processes and materials, however, applications of other processes and/or other materials may be appreciated those skilled in the art.

FIG. 1 shows a correspondence between Vds and Ids in a saturated operation state of LTPS and Indium Gallium Zinc Oxide (IGZO) at a left side of FIG. 1. In order to facilitate comparison between the LTPS and IGZO, a curve of LTPS in the left side of FIG. 1 is mirrored to obtain a comparison diagram shown in a right side of FIG. 1. As can be seen from FIG. 1 that a voltage Vds at which the IGZON-type TFT reaches saturation is less than a voltage Vds at which the LTPS-type TFT reaches saturation at the same Ids current. Therefore, the AA region power consumption can be reduced by replacing the LTPS TFT with the IGZO TFT.

Figure 2:
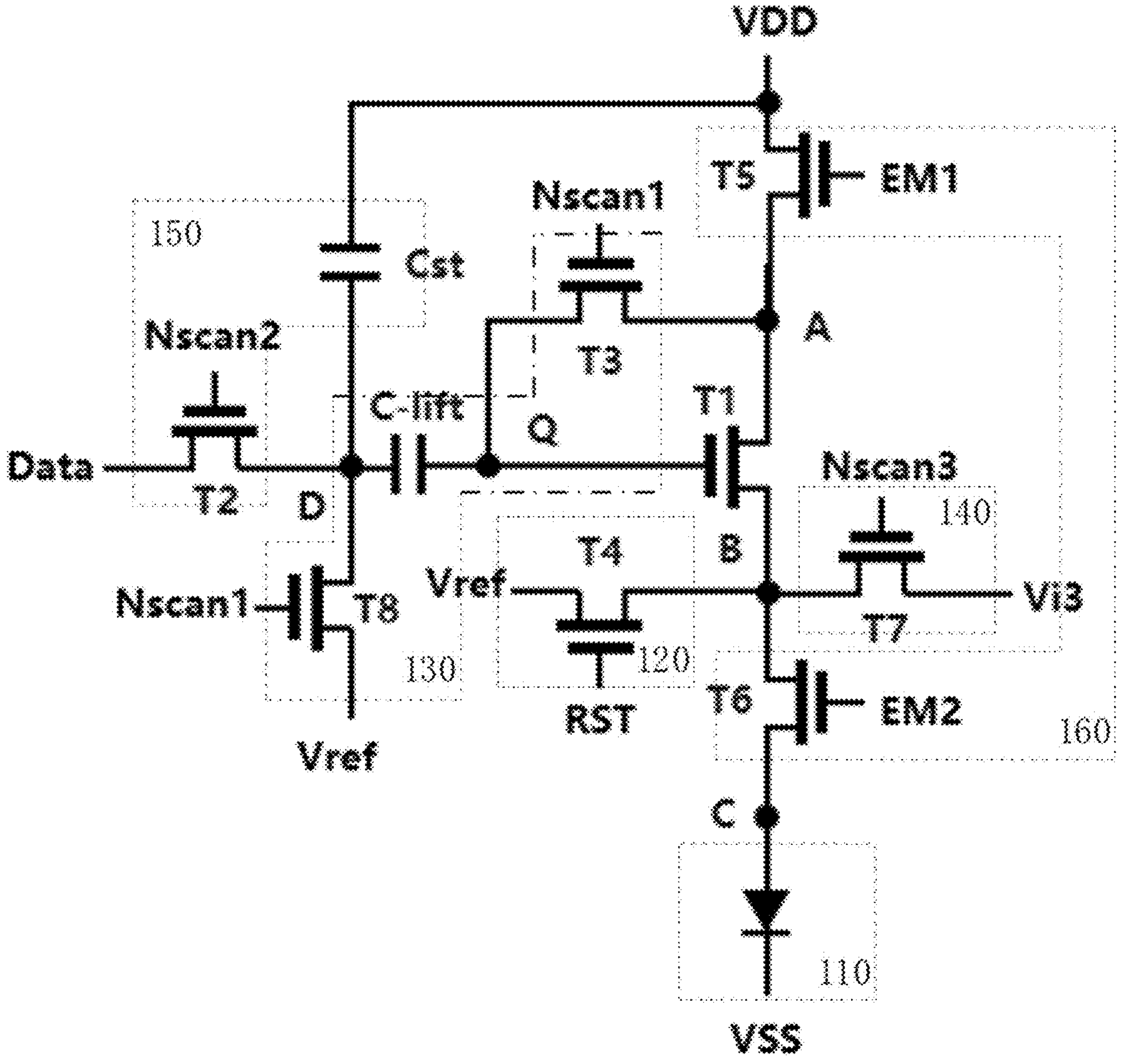
FIG. 2 is a schematic diagram of a pixel driving circuit according to some embodiments of the present disclosure.

Referring to FIG. 2, an embodiment of the present disclosure may provide a pixel driving circuit, including: a driving transistor T1, a light emitting circuit 110, a first reset circuit 120, a second reset circuit 130, a compensation circuit 140, a data writing circuit 150, and a light emitting control circuit 160.

The driving transistor T1 may be set to an N-type oxide semiconductor thin film transistor, such as IGZO TFT, and the AA region power consumption can be effectively reduced with respect to the P-type oxide semiconductor thin film transistor as the driving transistor T1. A source of the driving transistor T1 may be connected to a first power supply signal VSS, a drain of the driving transistor T1 may be connected to a second power supply signal VDD, and a voltage value of the first power supply signal VSS may be lower than a voltage value of the second power supply signal VDD. A cathode of the light emitting circuit 110 may be connected to the first power supply signal VSS, and an anode of the light emitting circuit 110 may be connected to the source of the driving transistor T1. The light emitting circuit 110 may be set to an LED lamp bead.

The first reset circuit 120 may be configured to reset the source of the driving transistor T1 and the drain of the driving transistor T1, the anode of the light emitting circuit 110 that is a third node B, a second node A, and a fourth node D, where a control terminal of the first reset circuit 120 is connected to a reset control signal RST, an input terminal of the first reset circuit 120 is connected to a first reset signal Vref, an output terminal of the first reset circuit 120 is connected to the driving transistor T1, and the first reset circuit 120 supplies the first reset signal Vref to the source of the driving transistor T1, the drain of the driving transistor T1 and the anode of the light emitting circuit 110 under the control of the reset control signal RST.

The second reset circuit 130 may be configured to set the gate of the driving transistor T1, where a control terminal of the second reset circuit 130 is connected to a first control signal Nscan1, an input terminal of the second reset circuit 130 is connected to a second reset signal Vref, and the second reset circuit 130 supplies the second reset signal Vref to the gate of the driving transistor T1 under the control of the first control signal Nscan1.

The compensation circuit 140 may be configured to capture a threshold voltage Vth of the driving transistor T1, where a control terminal of the compensation circuit 140 is connected to a second control signal Nscan3, an input terminal of the compensation circuit 140 is connected to a compensation voltage signal Vi3, and an output terminal of the compensation circuit 140 is connected to the source of the driving transistor T1.

The data writing circuit 150 may be configured to write a data signal Data corresponding to a gray scale required for displaying a pixel into the gate of the driving transistor T1, where a control terminal of the data writing circuit 150 is connected to a third control signal Nscan2, an input terminal of the data writing circuit 150 is connected to a data signal Data, and an output terminal of the data writing circuit 150 is connected to the gate of the driving transistor T1.

In the embodiments of the present disclosure, the compensation circuit 140 captures and writes the threshold voltage Vth of the driving transistor T1 into the gate of the driving transistor T1, and then the data writing circuit 150 can directly write data signal Data into the gate of the driving transistor T1 in writing the data signal Data without performing internal compensation for the Vth.

In some embodiments of the present disclosure, the second reset circuit 130 may include a first transistor T3, a second transistor T8, and a bootstrap capacitor C_lift. A gate of the first transistor T3 may be connected to the first control signal Nscan1, one of a source and a drain of the first transistor T3 may be connected to the drain of the driving transistor T1, that is a second node A, and another of the source and the drain of the first transistor T3 may be connected to the gate of the driving transistor T1 that is a fifth node Q. A gate of the second transistor T8 may be connected to the first control signal Nscan1, one of a source and a drain of the second transistor T8 may be connected to the second reset signal Vref, and another of the source and the drain of the second transistor T8 may be connected to the first node D.

One terminal of the bootstrap capacitor C_lift may be connected to the gate of the driving transistor T1, i.e., the fifth node Q, and another terminal of the bootstrap capacitor C_lift may be connected to the first node D. The output terminal of the data writing circuit 150 may be connected to the first node D. When the data writing circuit 150 writes data signals Data of different gray scales into the first node D, the bootstrap capacitor C_lift may bootstrap the potential of the fifth node Q to different positions by capacitive coupling.

In some embodiments of the present disclosure, the compensation circuit 140 may include a compensation transistor T7, where a gate of the compensation transistor T7 is connected to the second control signal Nscan3, one of a source and a drain of the compensation transistor T7 is connected to the compensation voltage signal Vi3, another of the source and the drain of the compensation transistor T7 is connected to the source of the driving transistor T1 that is the third node B, and the compensation voltage signal Vi3 is set to a fixed voltage.

Since Subthreshold Swing (SS) of the N-type oxide semiconductor thin film transistor is smaller, it is not necessary to capture the threshold voltage Vth of the driving transistor T1 by using the data voltage Data of different gray scales, but to capture the Vth by using the fixed voltage compensation voltage signal Vi3, thereby reducing the sensitivity of the SS of the TFT. In addition, Hyst of the IGZO device performs better, and therefore performs better for the residual image/Flicker and the like.

In some embodiments of the present disclosure, the data writing circuit 150 may include a data writing transistor T2 and a storage capacitor Cst, where one terminal of the storage capacitor Cst is connected to the first node D, and another terminal of the storage capacitor Cst is connected to the second power supply signal VDD. A gate of the data writing transistor T2 may be connected to the third control signal Nscan2, one of a source and a drain of the data writing transistor T2 may be connected to the data signal Data, and another of the source and the drain of the data writing transistor T2 may be connected to the first node D. The data writing transistor T2 may write the data signal Data to the first node D under the control of the third control signal Nscan2, and the bootstrap capacitor C_lift may bootstrap the potential of the gate of the driving transistor T1, i.e., the fifth node Q, to the corresponding position by means of capacitive coupling, while the storage capacitor Cst may be charged to maintain the potential of the first node D.

In some embodiments of the present disclosure, the light emitting control signal may include a first light emitting signal EM1 and a second light emitting signal EM2, and the light emitting control circuit 160 may include a first light emitting control transistor T5 and a second light emitting control transistor T6. A gate of the first light emitting control transistor T5 may be connected to the first light emitting signal EM1, one of a source and a drain of the first light emitting control transistor T5 may be connected to the second power supply signal VDD, and another of the source and the drain of the first light emitting control transistor T5 may be connected to the drain of the driving transistor T1 that is the second node A. A gate of the second light emitting control transistor T6 may be connected to the second light emitting signal EM2, one of a source and a drain of the second light emitting control transistor T6 may be connected to the first power supply signal VSS, and another of the source and the drain of the second light emitting control transistor T6 may be connected to the source of the driving transistor T1 that is the third node B.

The first light emitting control transistor T5, the driving transistor T1, the second light emitting control transistor T6, and the light emitting circuit 110 may be sequentially disposed between the second power supply signal VDD and the first power supply signal VSS. When the first light emitting control transistor T5, the driving transistor T1, and the second light emitting control transistor T6 are all turned on, the light emitting circuit 110 emits light, and Pulse Width Modulation (PWM) dimming may be performed by adjusting frequencies of the first light emitting signal EM1 and the second light emitting signal EM2.

In some embodiments of the present disclosure, the first reset circuit 120 may include a third transistor T4, where a gate of the third transistor T4 is connected to the reset control signal RST, one of a source and a drain of the third transistor T4 is connected to the first reset signal Vref, another of the source and the drain of the third transistor T4 is connected to the source of the driving transistor T1 that is the third node B, and the first reset signal Vref and the second reset signal Vref are a same signal Vref, so that the gate of the driving transistor T1, the source of the driving transistor T1, the drain of the driving transistor T1, the first node D, and the anode of the light emitting circuit 110 are all reset to the same potential Vref.

Figure 3:
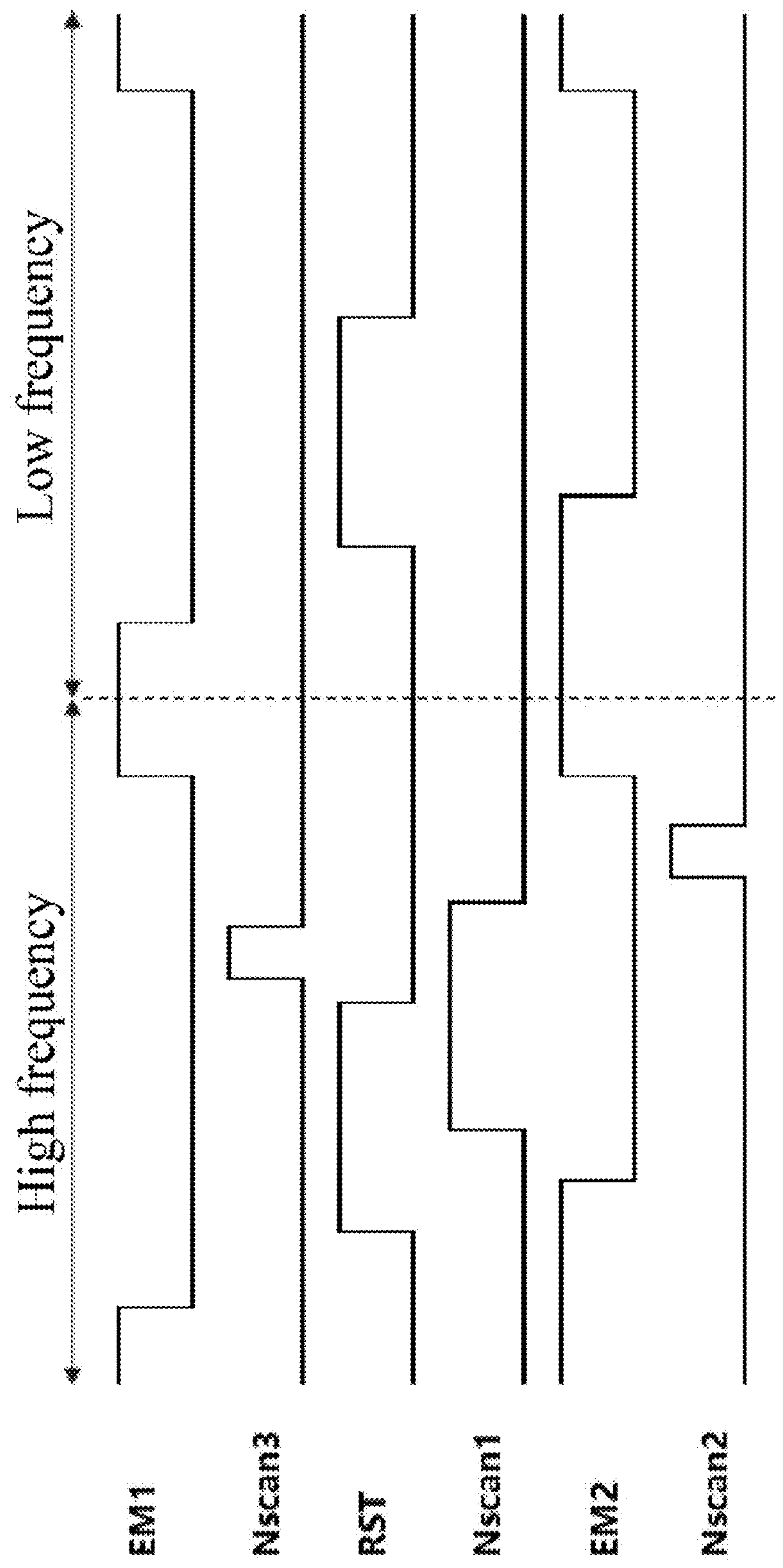
FIG. 3 is a schematic diagram of a driving timing of a pixel driving circuit according to some embodiments of the present disclosure.

In some embodiments of the present disclosure, when a certain frame of picture needs to be refreshed, i.e., a new data signal needs to be written, a driving timing of the pixel driving circuit is shown in FIG. 3, and specific steps are as follows.

Figure 4:
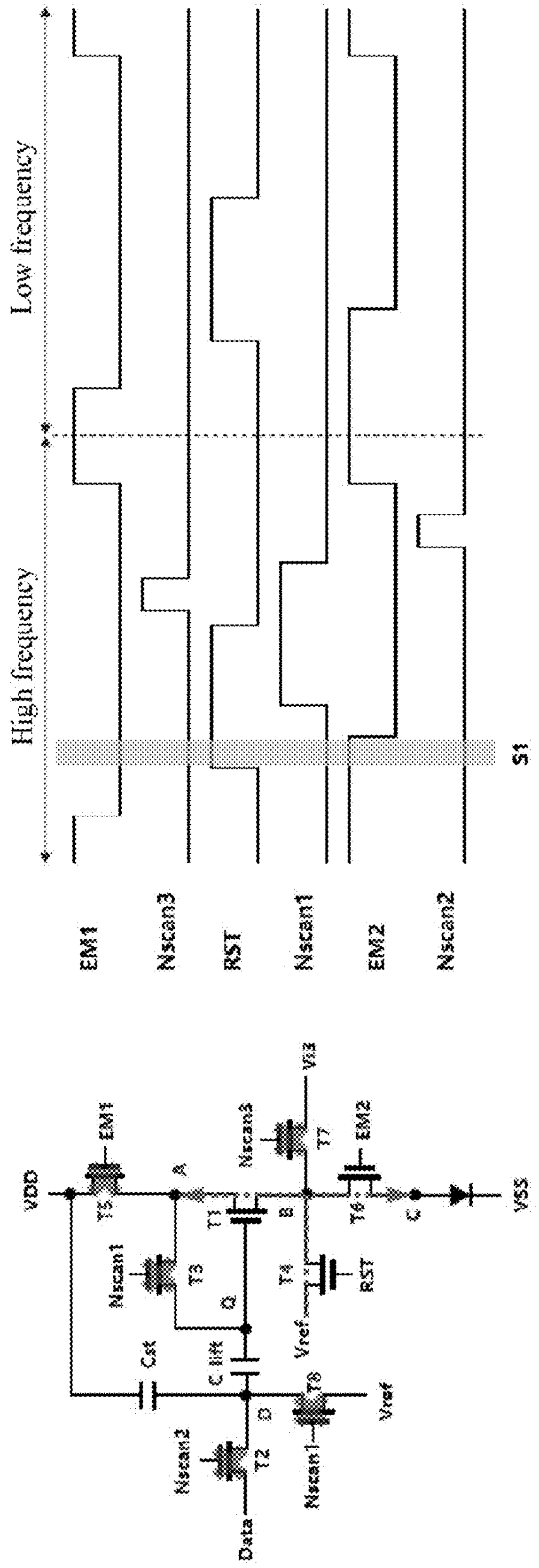
FIG. 4 is a schematic diagram of a pixel driving circuit and a driving timing of the pixel driving circuit according to some embodiments of the present disclosure.

As shown in FIG. 4, in a first reset phase S1, the reset control signal RST and the second light emitting signal EM2 are at high levels, the third transistor T4 and the second light emitting control transistor T6 both are turned on, and the first reset signal Vref is written into the source of the driving transistor T1, the drain of the driving transistor T1, and the anode of the light emitting circuit 110, that is, the third node B, the second node A, and the fourth node C all are reset. A fixed first reset signal Vref is written into the second node A and the third node B, so that the three-terminal voltage applied by the driving transistor T1 can be kept substantially unchanged, and the TFT can be electrically reset.

Figure 5:
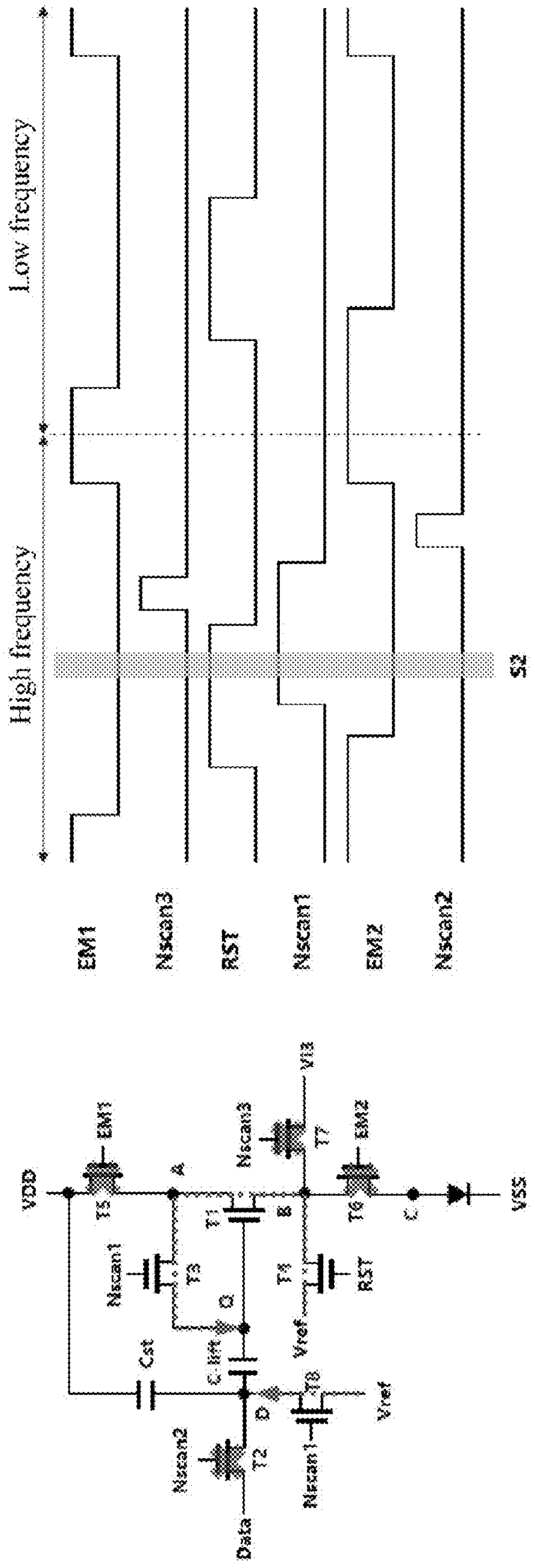
FIG. 5 is a schematic diagram of a pixel driving circuit and a driving timing of the pixel driving circuit according to some embodiments of the present disclosure.

As shown in FIG. 5, in a second reset phase S2, the reset control signal RST and the first control signal Nscan1 are at high levels, the first transistor T3, the second transistor T8, and the third transistor T4 all are turned on, the first reset signal Vref is written into the gate of the driving transistor T1, and the second reset signal Vref is written into the first node D.

Figure 6:
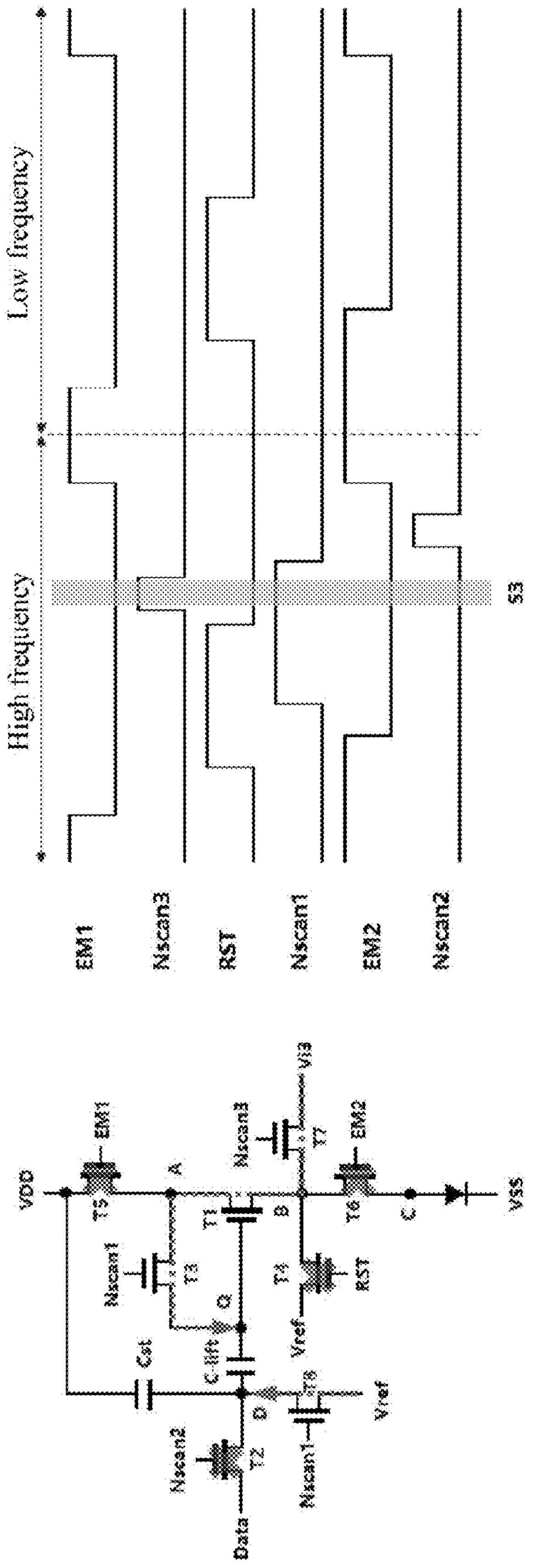
FIG. 6 is a schematic diagram of a pixel driving circuit and a driving timing of the pixel driving circuit according to some embodiments of the present disclosure.

As shown in FIG. 6, in a capacitor charging phase S3, the first control signal Nscan1 and the second control signal Nscan3 are at high levels, the first transistor T3, the second transistor T8, and the compensation transistor T7 all are turned on, the compensation voltage signal Vi3 is written into the source of the driving transistor T1 that is the third node B, a threshold voltage of the driving transistor T1 is captured and written into the gate of the driving transistor T1 that is the fifth node Q. Since the SS of the IGZO is too small, capturing Vth is performed on the TFT by using the fixed voltage compensation voltage signal Vi3, thereby reducing the difference between gray scales in capturing Vth.

Figure 7:
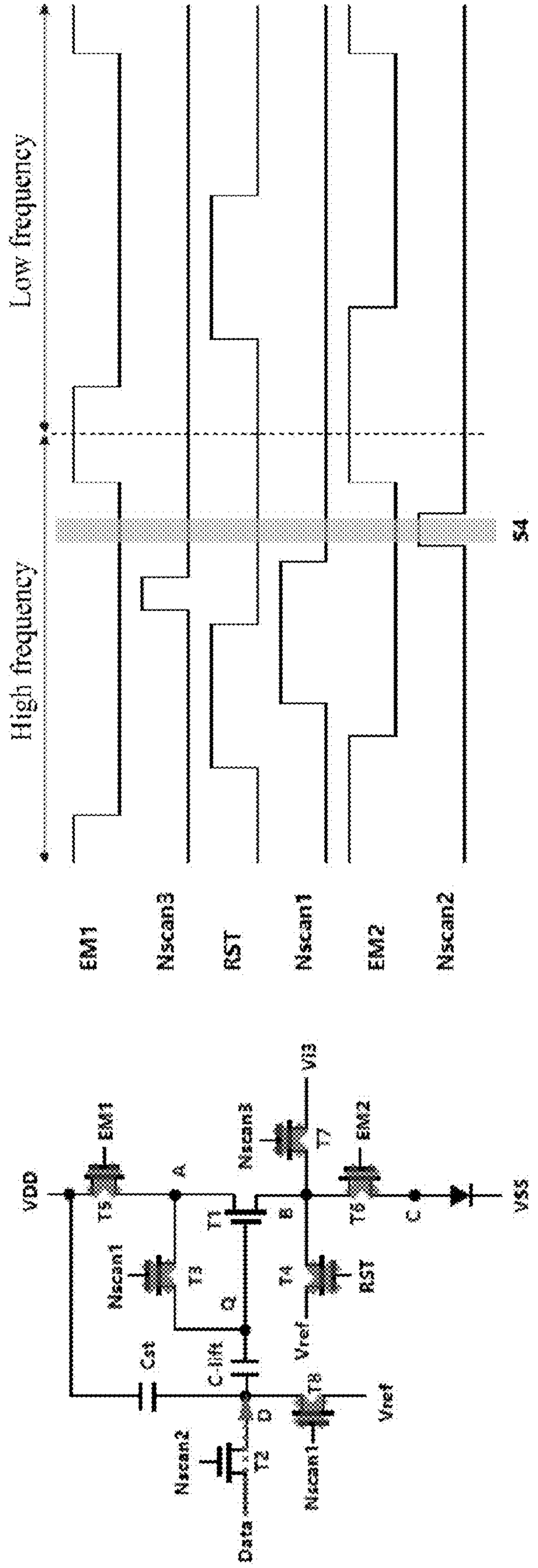
FIG. 7 is a schematic diagram of a pixel driving circuit and a driving timing of the pixel driving circuit according to some embodiments of the present disclosure.

As shown in FIG. 7, in a data writing phase S4, the third control signal Nscan2 is at a high level, the data writing transistor Q2 is turned on, the data signal Data is written into the first node D, the data signal is coupled to the gate of the driving transistor T1 that is the fifth node Q by the bootstrap capacitor C_lift, and the storage capacitor is charged to maintain the potential of the first node D.

Figure 8:
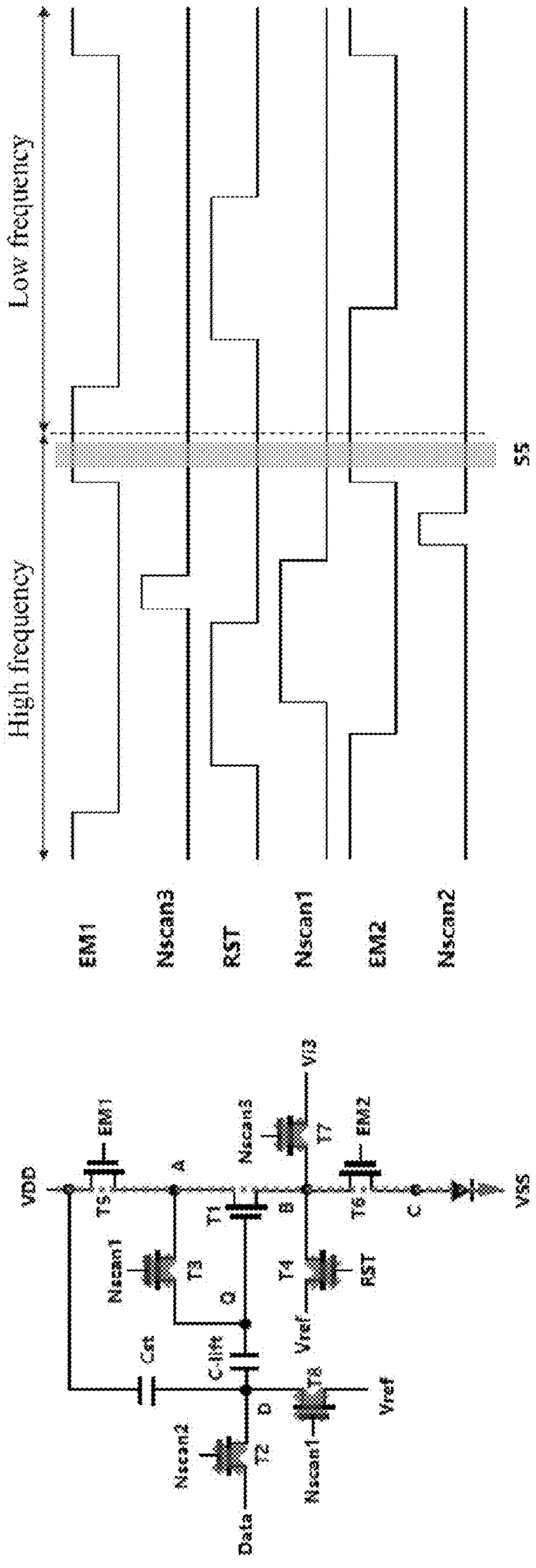
FIG. 8 is a schematic diagram of a pixel driving circuit and a driving timing of the pixel driving circuit according to some embodiments of the present disclosure.

As shown in FIG. 8, in a light emitting phase S5, the first light emitting signal EM1 and the second light emitting signal EM2 are at high levels, the first light emitting control transistor T5 and the second light emitting control transistor T6 are turned on, and the driving transistor T1 is held in an ON state based on the storage capacitor Cst driving the gate of the driving transistor T1 to hold the potential in the data writing stage S4, so as to enable the light emitting circuit 110 to emit light. PWM dimming is achieved by adjusting the frequencies of the first light emitting signal EM1 and the second light emitting signal EM2.

In the embodiments of the present disclosure, the driving timing of the pixel driving circuit may be a driving timing when a new data signal needs to be written in refreshing certain frame of picture, and defined as a driving timing for a high frequency frame that is a frame where data is refreshed.

In some embodiments of the present disclosure, when the new picture is to hold the previous frame of picture without refreshing the data, the driving timing of the pixel driving circuit may further include following steps.

Figure 9:
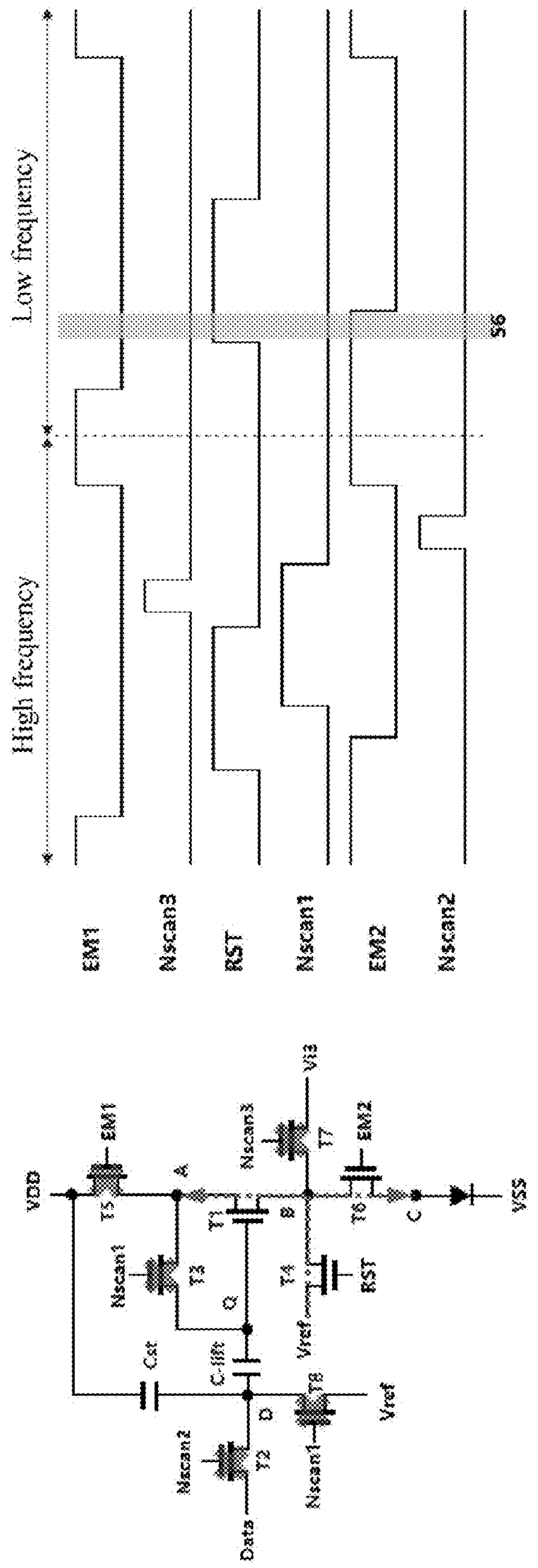
FIG. 9 is a schematic diagram of a pixel driving circuit and a driving timing of the pixel driving circuit according to some embodiments of the present disclosure.

As shown in FIG. 9, in a third reset phase S6, the reset control signal RST and the second light emitting signal EM2 are at high levels, the third transistor T4 and the second light emitting control transistor T6 are turned on, and the first reset signal Vref is written into the source of the driving transistor T1, the drain of the driving transistor T1, and the anode of the light emitting circuit 110, that is, the third node B, the second node A, and the fourth node C are reset. A fixed first reset signal Vref is written into the second node A and the third node B, so that the three-terminal voltage applied by the driving transistor T1 can be kept substantially unchanged, and the TFT can be electrically reset. However, the potentials of the first node D and the fifth node Q are kept unchanged and not reset, that is, the potential of the gate of the driving transistor T1 is kept as a data signal of the picture displayed in the previous frame, and the driving transistor T1 is kept in the ON state.

Figure 10:
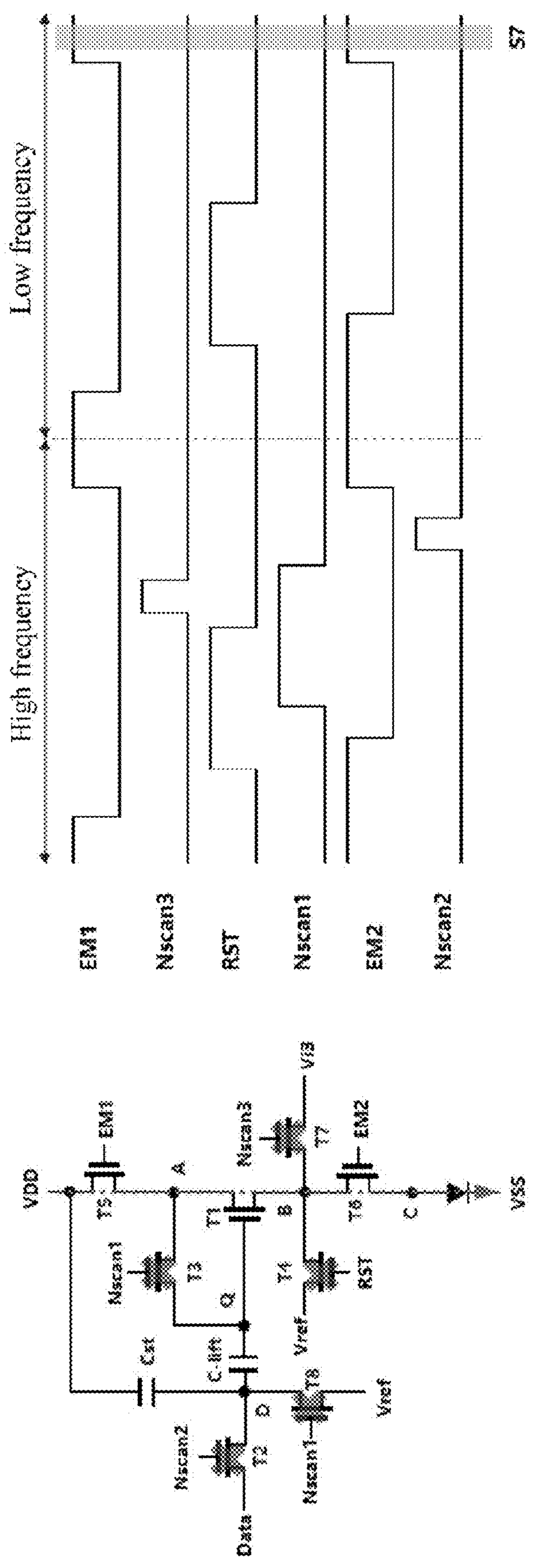
FIG. 10 is a schematic diagram of a pixel driving circuit and a driving timing of the pixel driving circuit according to some embodiments of the present disclosure.

As shown in FIG. 10, in a light emitting holding phase S7, the first light emitting signal EM1 and the second light emitting signal EM2 are at high levels, the first light emitting control transistor T5 and the second light emitting control transistor T6 are turned on, and based on the charge stored in the storage capacitor Cst, the gate of the driving transistor T1 is held at the potential of the picture displayed in the previous frame, the driving transistor T1 is held in the ON state, and the light emitting circuit 110 emits light.

In the embodiments of the present disclosure, the driving timing of the pixel driving circuit may be a driving timing when certain frame of picture does not need to be refreshed and no new data signal need to be written, and defined as a driving timing for a low frequency frame that is a frame where data is refreshed. The low frequency frame is a frame for holding previous frame of displayed data. The previous frame of the low frequency frame may be a high frequency frame or a low frequency frame. A refresh rate of the display panel may be adjusted by setting the low frequency frame.

In some embodiments of the present disclosure, when the driving transistor T1 is set to an N-type oxide semiconductor thin film transistor, other transistors in the pixel driving circuit all are set to N-type oxide semiconductor thin film transistors, which reduces the process difficulty. Moreover, when the TFT becomes IGZO, the leakage current of the TFTs in nodes can be reduced, and the stability of the node data in one frame can be increased.

In the embodiments of the present disclosure, the Vth is captured by using the fixed voltage compensation voltage signal Vi3, so that the sensitivity of the SS of the TFT is reduced. The compensation circuit 140 captures and writes the threshold voltage Vth of the driving transistor T1 into the gate of the driving transistor T1, and then the data writing circuit 150 can directly write data signal Data into the gate of the driving transistor T1 in writing the data signal Data without performing internal compensation for the Vth.

The present disclosure may further provide a display device, including the pixel driving circuit of any one of the foregoing embodiments of the present disclosure.

In the foregoing embodiments, descriptions of the embodiments are emphasized. A portion that is not described in detail in an embodiment may refer to related descriptions in another embodiment.

Any combination of the technical features in the foregoing embodiments may be performed. For brevity of description, all possible combinations of the technical features in the foregoing embodiments are not described. However, as long as there is no contradiction among the combination of the technical features, it should be considered as the scope described in this specification.

The pixel driving circuit and the display panel provided in the embodiments of the present disclosure are described in detail above. A specific example is used herein to describe a principle and an implementation of the present disclosure. The description of the foregoing embodiments is merely used to help understand a method and a core idea of the present disclosure. In addition, a person skilled in the art may make changes in a specific implementation manner and an application scope according to an idea of the present disclosure. In conclusion, content of this specification should not be construed as a limitation on the present disclosure.

What is claimed is:

1. A pixel driving circuit, comprising:

a driving transistor set to an N-type oxide semiconductor thin film transistor, wherein a source of the driving transistor is connected to a first power supply signal, a drain of the driving transistor is connected to a second power supply signal, and a voltage value of the first power supply signal is lower than a voltage value of the second power supply signal;

a light emitting circuit, wherein a cathode of the light emitting circuit is connected to the first power supply signal, and an anode of the light emitting circuit is connected to the source of the driving transistor;

a first reset circuit, wherein a control terminal of the first reset circuit is connected to a reset control signal, an input terminal of the first reset circuit is connected to a first reset signal, an output terminal of the first reset circuit is connected to the driving transistor, and the first reset circuit supplies the first reset signal to the source of the driving transistor, the drain of the driving transistor and the anode of the light emitting circuit under the control of the reset control signal;

a second reset circuit, wherein a control terminal of the second reset circuit is connected to a first control signal, an input terminal of the second reset circuit is connected to a second reset signal, and the second reset circuit supplies the second reset signal to the gate of the driving transistor under the control of the first control signal;

a compensation circuit, wherein a control terminal of the compensation circuit is connected to a second control signal, an input terminal of the compensation circuit is connected to a compensation voltage signal, and an output terminal of the compensation circuit is connected to the source of the driving transistor;

a data writing circuit, wherein a control terminal of the data writing circuit is connected to a third control signal, an input terminal of the data writing circuit is connected to a data signal, and an output terminal of the data writing circuit is connected to the gate of the driving transistor; and a light emitting control circuit, wherein a control terminal of the light emitting control circuit is connected to a light emitting control signal, and an input terminal and an output terminal of the light emitting control circuit are connected to the first power supply signal and the second power supply signal, respectively.

2. The pixel driving circuit of claim 1, wherein the second reset circuit comprises a first transistor, a second transistor, and a bootstrap capacitor;

a gate of the first transistor is connected to the first control signal, one of a source and a drain of the first transistor is connected to the drain of the driving transistor, and another of the source and the drain of the first transistor is connected to the gate of the driving transistor;

one terminal of the bootstrap capacitor is connected to the gate of the driving transistor, another terminal of the bootstrap capacitor is connected to a first node, and the output terminal of the data writing circuit is connected to the first node; and a gate of the second transistor is connected to the first control signal, one of a source and a drain of the second transistor is connected to the second reset signal, and another of the source and the drain of the second transistor is connected to the first node.

3. The pixel driving circuit of claim 2, wherein the compensation circuit comprises a compensation transistor, and wherein a gate of the compensation transistor is connected to the second control signal, one of a source and a drain of the compensation transistor is connected to the compensation voltage signal, another of the source and the drain of the compensation transistor is connected to the source of the driving transistor, and the compensation voltage signal is set to a fixed voltage.

4. The pixel driving circuit of claim 3, wherein the data writing circuit comprises a data writing transistor and a storage capacitor;

one terminal of the storage capacitor is connected to the first node, and another terminal of the storage capacitor is connected to the second power supply signal; and a gate of the data writing transistor is connected to the third control signal, one of a source and a drain of the data writing transistor is connected to the data signal, and another of the source and the drain of the data writing transistor is connected to the first node.

5. The pixel driving circuit of claim 4, wherein the light emitting control signal comprises a first light emitting signal and a second light emitting signal, and the light emitting control circuit comprises a first light emitting control transistor and a second light emitting control transistor;

a gate of the first light emitting control transistor is connected to the first light emitting signal, one of a source and a drain of the first light emitting control transistor is connected to the second power supply signal, and another of the source and the drain of the first light emitting control transistor is connected to the drain of the driving transistor; and a gate of the second light emitting control transistor is connected to the second light emitting signal, one of a source and a drain of the second light emitting control transistor is connected to the first power supply signal, and another of the source and the drain of the second light emitting control transistor is connected to the source of the driving transistor.

6. The pixel driving circuit of claim 5, wherein the first reset circuit comprises a third transistor, and wherein a gate of the third transistor is connected to the reset control signal, one of a source and a drain of the third transistor is connected to the first reset signal, another of the source and the drain of the third transistor is connected to the source of the driving transistor, and the first reset signal and the second reset signal are a same signal.

7. The pixel driving circuit of claim 6, wherein driving timing of the pixel driving circuit comprises:

a first reset phase in which the third transistor and the second light emitting control transistor both are turned on, and the first reset signal is written into the source of the driving transistor, the drain of the driving transistor, and the anode of the light emitting circuit;

a second reset phase in which the first transistor, the second transistor, and the third transistor all are turned on, the first reset signal is written into the gate of the driving transistor, and the second reset signal is written into the first node;

a capacitor charging phase in which the first transistor, the second transistor, and the compensation transistor all are turned on, the compensation voltage signal is written into the source of the driving transistor, and a threshold voltage of the driving transistor is captured and written into the gate of the driving transistor;

a data writing phase in which the data writing transistor is turned on, the data signal is written into the first node, the data signal is coupled to the gate of the driving transistor by the bootstrap capacitor, and the storage capacitor is charged; and a light emitting phase in which the first light emitting control transistor and the second light emitting control transistor both are turned on, and the light emitting circuit is configured to emit light.

8. The pixel driving circuit of claim 7, wherein the driving timing of the pixel driving circuit further comprising: after the light emitting phase, a third reset phase in which the third transistor and the second light emitting control transistor both are turned on, and the first reset signal is written into the source of the driving transistor, the drain of the driving transistor, and the anode of the light emitting circuit; and a light emitting holding phase in which the first light emitting control transistor and the second light emitting control transistor both are turned on, and the light emitting circuit is configured to emit light.

9. The pixel driving circuit of claim 1, wherein each of the transistors is set to an N-type oxide semiconductor thin film transistor.

10. A display device, comprising: a pixel driving circuit, comprising:

a driving transistor set to an N-type oxide semiconductor thin film transistor, wherein a source of the driving transistor is connected to a first power supply signal, a drain of the driving transistor is connected to a second power supply signal, and a voltage value of the first power supply signal is lower than a voltage value of the second power supply signal;

a light emitting circuit, wherein a cathode of the light emitting circuit is connected to the first power supply signal, and an anode of the light emitting circuit is connected to the source of the driving transistor;

a first reset circuit, wherein a control terminal of the first reset circuit is connected to a reset control signal, an input terminal of the first reset circuit is connected to a first reset signal, an output terminal of the first reset circuit is connected to the driving transistor, and the first reset circuit supplies the first reset signal to the source of the driving transistor, the drain of the driving transistor and the anode of the light emitting circuit under the control of the reset control signal;

a second reset circuit, wherein a control terminal of the second reset circuit is connected to a first control signal, an input terminal of the second reset circuit is connected to a second reset signal, and the second reset circuit supplies the second reset signal to the gate of the driving transistor under the control of the first control signal;

a compensation circuit, wherein a control terminal of the compensation circuit is connected to a second control signal, an input terminal of the compensation circuit is connected to a compensation voltage signal, and an output terminal of the compensation circuit is connected to the source of the driving transistor;

a data writing circuit, wherein a control terminal of the data writing circuit is connected to a third control signal, an input terminal of the data writing circuit is connected to a data signal, and an output terminal of the data writing circuit is connected to the gate of the driving transistor; and a light emitting control circuit, wherein a control terminal of the light emitting control circuit is connected to a light emitting control signal, and an input terminal and an output terminal of the light emitting control circuit are connected to the first power supply signal and the second power supply signal, respectively.

11. The display device of claim 10, wherein the second reset circuit comprises a first transistor, a second transistor, and a bootstrap capacitor;

a gate of the first transistor is connected to the first control signal, one of a source and a drain of the first transistor is connected to the drain of the driving transistor, and another of the source and the drain of the first transistor is connected to the gate of the driving transistor;

one terminal of the bootstrap capacitor is connected to the gate of the driving transistor, another terminal of the bootstrap capacitor is connected to a first node, and the output terminal of the data writing circuit is connected to the first node; and a gate of the second transistor is connected to the first control signal, one of a source and a drain of the second transistor is connected to the second reset signal, and another of the source and the drain of the second transistor is connected to the first node.

12. The display device of claim 11, wherein the compensation circuit comprises a compensation transistor, and wherein a gate of the compensation transistor is connected to the second control signal, one of a source and a drain of the compensation transistor is connected to the compensation voltage signal, another of the source and the drain of the compensation transistor is connected to the source of the driving transistor, and the compensation voltage signal is set to a fixed voltage.

13. The display device of claim 12, wherein the data writing circuit comprises a data writing transistor and a storage capacitor;

one terminal of the storage capacitor is connected to the first node, and another terminal of the storage capacitor is connected to the second power supply signal; and a gate of the data writing transistor is connected to the third control signal, one of a source and a drain of the data writing transistor is connected to the data signal, and another of the source and the drain of the data writing transistor is connected to the first node.

14. The display device of claim 13, wherein the light emitting control signal comprises a first light emitting signal and a second light emitting signal, and the light emitting control circuit comprises a first light emitting control transistor and a second light emitting control transistor;

a gate of the first light emitting control transistor is connected to the first light emitting signal, one of a source and a drain of the first light emitting control transistor is connected to the second power supply signal, and another of the source and the drain of the first light emitting control transistor is connected to the drain of the driving transistor; and a gate of the second light emitting control transistor is connected to the second light emitting signal, one of a source and a drain of the second light emitting control transistor is connected to the first power supply signal, and another of the source and the drain of the second light emitting control transistor is connected to the source of the driving transistor.

15. The display device of claim 14, wherein the first reset circuit comprises a third transistor, and wherein a gate of the third transistor is connected to the reset control signal, one of a source and a drain of the third transistor is connected to the first reset signal, another of the source and the drain of the third transistor is connected to the source of the driving transistor, and the first reset signal and the second reset signal are a same signal.

16. The display device of claim 15, wherein driving timing of the pixel driving circuit comprises:

a first reset phase in which the third transistor and the second light emitting control transistor both are turned on, and the first reset signal is written into the source of the driving transistor, the drain of the driving transistor, and the anode of the light emitting circuit;

a second reset phase in which the first transistor, the second transistor, and the third transistor all are turned on, the first reset signal is written into the gate of the driving transistor, and the second reset signal is written into the first node;

a capacitor charging phase in which the first transistor, the second transistor, and the compensation transistor all are turned on, the compensation voltage signal is written into the source of the driving transistor, and a threshold voltage of the driving transistor is captured and written into the gate of the driving transistor;

a data writing phase in which the data writing transistor is turned on, the data signal is written into the first node, the data signal is coupled to the gate of the driving transistor by the bootstrap capacitor, and the storage capacitor is charged; and a light emitting phase in which the first light emitting control transistor and the second light emitting control transistor both are turned on, and the light emitting circuit is configured to emit light.

17. The display device of claim 16, wherein the driving timing of the pixel driving circuit further comprising: after the light emitting phase, a third reset phase in which the third transistor and the second light emitting control transistor both are turned on, and the first reset signal is written into the source of the driving transistor, the drain of the driving transistor, and the anode of the light emitting circuit; and a light emitting holding phase in which the first light emitting control transistor and the second light emitting control transistor both are turned on, and the light emitting circuit is configured to emit light.

18. The display device of claim 10, wherein each of the transistors is set to an N-type oxide semiconductor thin film transistor.

* * * * *